United States Patent Office 3,152,997
Patented Oct. 13, 1964

3,152,997
PREPARATION OF A MOLYBDENUM OXIDE-IRON OXIDE CATALYST COMPOSITION
Giulio Natta, Milan, Mario Baccaredda, Pisa, Francesco Traina, Remo Pergolini, and Eugenio Balcet, Novara, and Umberto Soldano, Milan, Italy, assignors to Montecatini Società Generale per l'Industria Mineraria e Chimica, Milan, Italy
No Drawing. Filed Oct. 16, 1959, Ser. No. 846,791
Claims priority, application Italy Oct. 28, 1958
11 Claims. (Cl. 252—470)

This invention relates to the preparation of a catalyst comprising molybdenum oxide for oxidizing methanol to formaldehyde, and its process of use.

Molybdenum oxide has been used as a catalyst in the oxidation of methanol to formaldehyde for a long time. The known molybdenum catalysts however have the disadvantage that they crumble and cause excessive formation of powder, with all the dangerous consequences deriving therefrom. The high brittleness of these catalysts also rendered necessary their preparation at their place of use, in order to avoid crumbling in transportation.

In order to avoid these disadvantages and inconveniences recourse has recently been had to the system of preparing a non-active pre-catalyst, having a higher mechanical strength, which can be transported. The pre-catalyst was then activated in the methanol converter. This improvement has however a very limited advantage because said pre-catalyst loses a part of its initial mechanical strength during said activation. Moreover, during the process of oxidizing methanol the crumbling phenomenon, arising from the decreased mechanical strength, increases the pressure drop to such an extent that the catalyst must be removed from the reactor after a working period which does not exceed 60 days. Reference is made to U.S. Patent No. 2,812,309 in this relation.

All the catalysts known until now have, in practice, the following disadvantages: low mechanical strength, ease of crumbling, high pressure drops in the reacting gases and short duration.

An object of the present invention is the preparation of an improved catalyst comprised of molybdeum oxide, having markedly high activity, productivity, and selectivity, and with very good mechanical characteristics, the use of which, in the catalytic oxidation of methanol, is not attended by the said disadvantages, and which above all, maintians such characteristics for a time much longer than one year.

Another object of the present invention is the preparation of the molybdenum oxide catalyst in high yields in respect to the molybdenum used.

The catalyst according to the present invention is a non-supported catalyst comprising molybdenum oxide and iron oxide. It does not require any activation in the reactor, and in this respect is to be distinguished from pre-catalysts.

The new catalyst consists of 78–81% $MoO_3$ and 18–19% $Fe_2O_3$. The weight ratio Mo/Fe in the finished product is between 3.9 and 4.3.

Before its use, the catalyst evidences a high degree of crystallinity upon X-ray examination, whereas the previously known catalysts have an amorphous structure or at most a structure at the boundary between crystalline and amorphous.

The process of preparation claimed by us comprises a series of operations which integrate each other. No operation can be omitted or significantly varied beyond the described limits without detriment to the end results. However, some less desirable operations outside these limits are not excluded from the broader scope of the invention. The preparation of the catalyst according to the present invention differs from the known processes in respect to the particular mechanical processing and the high activation temperature.

In summary, the preferred process comprises:

(a) Precipitation of iron molybdates from diluted solutions of soluble molybdates and soluble iron salts; the weight ratio Mo/Fe in the reactants is preferably between 4.5 and 4.7;
(b) Washing the precipitate in order to eliminate the soluble salts formed in the reaction between molybdates and iron salts;
(c) Drying the filtered precipitate to reduce the water content to 40–50%;
(d) Special mechanical treatment of the cake dried as indicated under (c), by plastic processing, such as roll milling;
(e) Shaping the catalysts into regular granules, such as small regular cylinders, having a height equal to the diameter;
(f) Gradual drying according to a time-temperature schedule of the type specified in Example 1 below;
(g) Activation of the dried catalyst by thermal treatment at a temperature gradually increasing up to 420° C.

The following considerations demonstate that these operations are interdependent and have complementary effects:

(1) The separate precipitation of the two hydroxides and their subsequent mechanical mixing lead to catalysts which are not selective and therefore are not suitable for the production of formaldehyde;
(2) An insufficient washing of the mixture of precipitated oxides leaves in the catalyst some foreign components which damage its activity and selectivity, or even its mechanical strength if the hydroxides are decomposed by thermal treatment;
(3) An excessively high water content in the cake, namely higher than 50% hinders good mechanical action or treatment in the plastic processing of the cake. In the absence of said treatment the catalyst shaping does not take place well, and during the following processing the catalyst crumbles down or, at least, remains friable;
(4) The catalyst cannot be suitably activated if not subjected to a previous slow drying since a quick temperature increase causes cracking and crumbling down of the catalyst.

The precipitation of iron molybdates is carried out by mixing the molybdate solution with a solution of an iron salt. For instance, ammonium heptamolybdate and ferric chloride solution can be used.

The precipitation is carried out at a temperature of 50 to 60° C. while vigorously stirring. A warm molybdate solution is preferably used, whereas the iron salt solution is employed at room temperature in order to avoid its hydrolysis.

To obtain a catalyst having the desired composition, and with high yields in respect to molybdenum used, the weight ratio Mo/Fe in the reactants used must be between 4.5 and 4.7.

If ammonium molybdate and ferric chloride solutions are used it is not necessary to correct their pH. If, however the ammonium molybdate solution was previously acidified in order to adjust its pH to near that of the ferric solution, the precipitation would not be adversely affected, but a careful washing of the catalyst thus obtained would involve a higher molybdenum loss and an alteration in the composition of the precipitate, resulting in a decrease in the yield of catalyst in respect to molybdenum expended and a decrease in the activity of the catalyst.

The concentration of the ammonium molybdate and ferric chloride solutions should be kept at about 5% by weight. Excessively diluted solutions result in a lower yield of catalyst. Excessively concentrated solutions result in precipitates that are scarcely homogeneous or contaminated by undesirable products.

The catalyst has low sensibility to impurities, within certain limits adequate for practical application. We have determined experimentally that Al and Mg have no influence even when their content amounts to 0.03%. The same is true for Cr and Si in amounts of 0.1%, and for Ca in amounts of 0.3%.

The washing of the precipitate must be carried out so as to eliminate most of the soluble salts formed in the reaction between the molybdate and the iron salt. When using ferric chloride, the cake is washed until its chlorine content becomes lower than 0.13 g. per 100 g. molybdenum.

The preliminary drying must reduce the total water content of the precipitate to 40-50% in order to render effective the subsequent mechanical treatment of plastic processing. The optimum range of water content is between 45 and 47%. The mechanical treatment, that is, the plastic processing, can be carried out by passing the broken cake through a roll mill or a calender until it is transformed into sheets, the operation being repeated many times.

The mechanical treatment, the plastic processing, increases the cohesion between the solid particles of the cake and imparts to the catalyst a higher mechanical strength which is further augmented by the subsequent drying and activation operations. This effect can be ascribed to the particular structure of the molybdates, which can be viewed as polymeric products consisting of extended or chain molecules. The latter can therefore be partially oriented by means of mechanical treatment, such as rolling.

The shaping of the catalyst can be carried out by passing it through a roll mill provided with bored rolls or by extrusion through an extruder, both the roll mill and the extruder being provided with a cutter.

Equidimensional granules are preferred, that is, small cylinders whose height is equal to their diameter. The use of equidimensional granules, whose size has previously been stabilized by the aforementioned mechanical treatment and by the following thermal treatment, offers the advantage of facilitating regular distribution of the reacting gases in the catalytic mass, which fact is extremely important for the obtainment of high yield of formaldehyde. Moreover, it makes it possible to reduce the pressure drops and their increase in time. The low pressure drop allows the use of granules of reduced size, which permit homogeneous filling even when the reaction is carried out in tubes of small diameter.

In this case the high value of the ratio between the tube surface and the catalyst volume facilitates effective thermal control of the reaction, thus obtaining advantages in the potentiality of the reactors and in the reaction yields. Very good results are obtained with equidimensional cylinders when these have a diameter and height of 3.5 mm. and the reactor tubes have an inner diameter of 15 mm.

The final drying is carried out with air, with any conventional drier, provided that special conditions of graduality in operation are complied with. In a first stage the catalyst must be kept at room temperature for the time needed to obtain a surface drying effect, which results in the formation of a film to avoid the mutual adhesion of the granules. The catalyst is then almost completely dried by gradually increasing the temperature up to 120° C.

The activation is carried out by increasing progressively the temperature from 100 to 400-450° C. within a period of time not lower than 4 hours and then keeping the catalyst at the final temperature for at least a further 4 hours. Final roasting temperatures lower than 400° C. or higher than 450° C. lower the activity of the catalyst substantially.

This procedure offers marked, substantial advantages in comparison with methods previously described, in which the activation of the catalyst is carried out after the catalyst has been introduced into the catalytic reactor before or while starting the operation.

By the process of the present invention the catalyst acquires a higher strength and hardness during the drying and the activation, due to a gradual contraction of the granules, and can therefore be packed and delivered without any danger of alteration or crumbling resulting in the formation of powder.

The following examples relating to the preparation of the catalyst and its use in the catalytic oxidation of methanol to formaldehyde are reported in order to illustrate the invention without limiting its scope.

*Example 1*

400 liters of water and 20 kilograms of ammonium heptamolybdate containing 54% Mo are placed in a wooden vat provided with a stirrer.

The resulting solution, at a pH of 4.5 to 5.0, is heated up to 60° C.

In another vessel resistant to ferric chloride, e.g., made of glass or iron lined with ebonite, 11 kg. hexahydrated ferric chloride are dissolved in 220 liters water.

The resulting solution has a pH value of 1.0 to 1.5. Both solutions have the same concentration, i.e., about 5%. The ferric chloride solution is poured into the ammonium molybdate solution while vigorously stirring.

The precipitate is then allowed to settle and the liquid is siphoned off. The precipitate is then washed four times with 1200 liters water divided in 4 equal fractions, each time eliminating by decantation 320 liters washing water.

The thickened precipitate is filtered under vacuum of 200 mm. Hg.

The cake containing 60 to 65% by weight of water is dried to reduce the water content to 45-47%. It is then broken and transformed into sheets by successive passages through a granite roll mill whose rolls rotate at the speed of 28 and 45 r.p.m. respectively. By employing a roll mill provided with bored rolls smaller regular cylinders with a diameter and height of 4.2 mm. are obtained from the rolled sheet.

Then follows drying in an air current for 6 hours at room temperature (15-30° C.), for 12 hours at 40° C., for 6 hours at 60° C., and finally for 6 hours at 120° C.

The activation in an air current is carried out in a muffle with catalyst layers having a height of 5-6 cm. and gradually increasing the temperature. The activation has a total duration of 10 hours, the catalyst being kept at 150° C. for 2 hours and then for 1 hour at each of the following temperatures; 200°, 250° and 300° C., and finally for 5 hours at 420° C. During each of these activation stages the catalyst loses progressively 5%, 5.5%, 5.8%, 6.2% and 6.5% of its initial weight.

16.2 kg. of finished catalyst are thus obtained, corresponding to 1.5 kg. catalyst per 1 kg. of starting molybdenum.

At the end of the aforementioned operations the catalyst has taken its definitive shape, namely that of cylinders having a diameter of 3.5 mm. and a height of 3.5 mm., and is now ready for the use.

The average breaking load is 7.4 kg. per cylindrical granule. Of a total of 100 test granules, 50 have a breaking load under compression higher than 7 kg. and 86 granules higher than 5 kg.

The catalyst can tolerate transportation over a long distance and is not altered even after storage for a long time.

The following is an example of a process employing the catalyst prepared as described above.

571 kg. catalyst were charged into the tubes of a tube bundle which forms the reactor. The tubes had an inner diameter of 15 cm., and a conventional thermostatic fluid was circulated outside the tubes. Each tube was filled to a height of 485 mm. The catalyst occupied a total volume of 635 liters. A gaseous air-methanol mixture containing 6.5% by volume methanol was introduced into the reactor at a space velocity of 8.9 Nm.³/h. per liter of catalyst. The symbol Nm³ means cubic meters of gas recalculated at 0° C. and 760 mm. of mercury pressure.

The temperature of the gas entering the catalytic bed was about 270° C. while the average outlet temperature was 330° C.

During a period of 318 days 4020 tons of 100% methanol were employed and 9483 metric tons of 36% (by weight) formaldehyde were produced with an average yield of 90.6%. The average productivity of the catalyst was therefore 18.8 kg. 100% formaldehyde per 1 kg. catalyst per day, corresponding to 16.9 kg./kg. catalyst per day. These yields comprise also the absorption yields of the formaldehyde produced into water.

The reaction yields are therefore higher due to the loss of the formaldehyde contained in the exhaust gases of the plant.

During the same observation period the average pressure drop through the catalyst was 62 mm. Hg, gradually passing from the initial 37 mm. to 87 mm. after 318 days.

Correspondingly the absolute pressure in the reactor varied from 834 mm. to 884 mm. Hg.

A typical analysis of the formaldehyde produced by the plant in the aforementioned period is as follows:

| | Percent by weight |
|---|---|
| Formaldehyde | 36.1 |
| Methanol | 0.7 |
| Formic acid | 0.006 |

Example 2

A second stock of catalyst, prepared according to the modalities described in Example 1, was charged into a second commercial plant having almost double the potentiality or capacity of the preceding plant.

1312 kg. catalyst were employed. The reactor consisted of a series of tubes having an inner diameter of 15 mm., like those of Example 1, which were filled up to the height of 705 mm. The catalyst occupied a total volume of 1405 liters. A space velocity of 8.2 Nm.³/h. of air methanol mixture per 1 liter of catalyst was maintained. The mixture contained 6.5% methanol by volume.

The temperature of the gas entering the catalytic bed was about 270° C. while the average outlet temperature was of 320° C.

During a period of 359 days 9174 metric tons of 100% methanol were employed and 21.574 metric tons of 36% formaldehyde (by weight) were produced with an average yield of 90.3%. The average productivity of the catalyst was therefore 16.5 kg. 100% formaldehyde per 1 kg. catalyst per day, corresponding to 15.4 kg./kg. catalyst per day. For the reason indicated in Example 1, the reaction yields are higher.

During the same observation period the average pressure drop through the catalyst was 133 mm. Hg, passing from the initial 90 mm. to 176 mm. after 359 days.

A typical analysis of the formaldehyde produced in this second plant during the observation period of 359 days is as follows:

| | Percent by weight |
|---|---|
| Formaldehyde | 36.4 |
| Methanol | 0.5 |
| Formic acid | 0.005 |

Example 3

A third stock of 732 kg. catalyst, prepared according to the procedure described in Example 1, was charged into the plant of Example 1.

The reactor tubes were charged up to a height of 610 mm. The catalyst occupied a total volume of 796 liters. A space velocity of 6.9 Nm.³/h. of methanol-air mixture per 1 liter of catalyst was maintained. The mixture contained 6.5% methanol by volume. The temperatures of the gas entering and leaving the catalytic bed were practically equal to those of Example 1.

During a period of 447 days 5481 metric tons of 100% methanol were fed and 12,971 metric tons of 36% formaldehyde (by weight) were produced with an average yield of 91.0%. The average productivity of the catalyst was therefore 14.3 kg. 100% formaldehyde per 1 kg. catalyst per day, corresponding to 13.1 kg./kg. catalyst per day. The reaction yields are higher than those indicated here, formaldehyde being vented in the exhaust gases.

During the same observation period the average pressure drop through the catalyst was 87 mm. Hg, being gradually passed from the initial 38 mm. to 156 mm. after 447 days.

The catalyst has remained operative over a long period of time.

A typical analysis of the formaldehyde produced in this period is as follows:

| | Percent by weight |
|---|---|
| Formaldehyde | 36.2 |
| Methanol | 0.2 |
| Formic acid | 0.006 |

The operating conditions described in the preceding examples are illustrative and are not intended to limit the scope of the present invention. At the temperatures mentioned therein the formaldehyde yield remains practically unaltered by varying the space velocity from 6 to 13 Nm.³/h. of gaseous mixture per liter of catalyst and keeping the volume concentration of methanol below 8%.

The catalytic oxidation of methanol to formaldehyde with the catalyst of the present invention is carried out under atmospheric pressure increased by a pressure corresponding to the pressure drop of the reacting gases through the catalyst bed in the reactor.

The catalyst obtained by the process of the present invention offers many advantages which are summarized as follows:

(1) The catalyst is ready for the use at any moment without requiring any further treatment in the reactor employed for the oxidation of methanol.

(2) It does not crumble like the prior catalysts, and has considerable mechanical strength. The average breaking load under compression is 7.4 kg. per each cylindrical granule having a diameter and height of 3.5 mm. It can therefore be delivered or transported over very long distances.

(3) The catalyst presents a regular and uniform granulometry resulting in a low pressure drop and the homogeneous or uniform permeability of gases through the catalytic bed. The small size allows easy filling of the reactor tubes and makes it possible to limit the inner diameter of the same tubes, e.g., to 15 mm., with considerable advantage in the elimination of the reaction heat and in respect to yields.

(4) The pressure drop during the entire life of the catalyst remains below that of the known catalysts, the other operative conditions being the same, such as linear velocity of the gases, temperatures, pressures, etc. In this relation U.S. Patent No. 2,812,309 is in mind.

(5) Another advantage is the high preparation yield of catalyst obtained in the preparation, 1.5 kilograms of catalyst being obtained from 1 kg. molybdenum. In contrast, according to the prior art only 0.84 pre-catalyst or 0.73 kg. finished catalyst are obtained from 1 kg. molybdenum, according to the process described in U.S. Patent No. 2,812,309.

(6) The excellent catalytic properties, namely, selectivity, and productivity, are due to the very good physical properties. The high activity makes it possible to obtain average yields of 90–91% over long periods of operation, yielding in a single passage of methanol over the catalyst, formaldehyde containing at most 1% methanol by weight. The selectivity makes it possible to reduce to a minimum the reaction side-products present in the formaldehyde obtained. These side-products are substantially limited to formic acid solely, and always in concentrations below 0.01% by weight. The productivity of the catalyst of the present invention is much higher than that of the prior catalysts, such as those described in U.S. Patent No. 2,812,309 and U.S. Patent No. 2,812,310. It is noted that the productivities mentioned in our examples are not the highest obtainable. They increase in direct proportion to the space velocity and the methanol concentration.

(7) Finally, the catalyst of the present invention has a very extraordinary life, being longer than one year while at the same time preserving its excellent catalytic and mechanical properties almost completely. As a consequence of said long life and of the high productivity of the catalyst, its productive capacity is very high. More than 17,000 tons of 36% formaldehyde, by weight, are obtained from 1 ton catalyst.

We claim:

1. A process for preparing a non-supported active catalyst consisting of molybdenum oxide and iron oxide, for the catalytic oxidation of methanol to formaldehyde, said catalyst requiring no pre-activation in the reactor used for carrying out said catalytic oxidation, and being characterized by high resistance to crumbling in transportation and during the said catalytic oxidation, said process comprising mixing an aqueous solution of a soluble molybdate and an aqueous solution of a soluble iron salt to precipitate an iron molybdate, washing the precipitate to remove water soluble salts, separating the iron molybdate precipitate from the wash water, drying the precipitate to a water content of about 40 to 50 percent, mechanically working the iron molybdate between surfaces moving at different linear speeds to shape the iron molybdate into granules having the same size and shape with each granule having a diameter substantially equal to its height, further drying the granules and activating them by a progressive thermal treatment between the range from 100° C. to 450° C.

2. The process of claim 1, wherein the drying of the precipitate is continued until its water content is reduced to 45–47% by weight.

3. A process for preparing a non-supported active catalyst essentially consisting of molybdenum oxide and iron oxide for the catalytic oxidation of methanol to formaldehyde, said catalyst requiring no pre-activation in the reactor used for carrying out said catalytic oxidation, and being characterized by high resistance to crumbling in transportation and during the said catalytic oxidation, said process comprising mixing an aqueous solution of ammonium molybdate and an aqueous solution of ferric chloride to precipitate an iron molybdate, washing the precipitate to remove the water soluble salts, separating the iron molybdate precipitate from the wash water, drying the precipitate to a water content of about 45 to 47 percent, mechanically working the iron molybdate between surfaces moving at different linear speeds to shape the iron molybdate into granules having the same size and shape with each granule having a diameter substantially equal to its height, further drying the granules and activating them by a progressive thermal treatment between the range from 100° C. to 450° C.

4. The process of claim 3, wherein the washing of the precipitated mixture is continued until the chlorine content of the cake is reduced to less than 0.13 g. chlorine per 100 g. molybdenum.

5. The process of claim 3, the granules being cylindrical granules having a diameter of about 3.5 mm., and a height of 3.5 mm., and an average breaking load of about 7.4 kg. per granule.

6. A process for preparing a non-supported, that is carrier-free, active catalyst consisting of molybdenum oxide and iron oxide for the catalytic oxidation of methanol to formaldehyde, the weight ratio of molybdenum to iron in the finished catalyst being between about 3.9 and 4.3, said catalyst requiring no pre-activation in the reactor used for carrying out said catalytic oxidation, and being characterized by high resistance to crumbling in transportation and during the said catalytic oxidation, said process comprising mixing an aqueous solution of a soluble molybdate and an aqueous solution of a soluble iron salt, in which the weight ratio of molybdenum to iron is between about 4.5 and 4.7, to precipitate an iron molybdate, washing the precipitate to remove water soluble salts, separating the iron molybdate precipitate from the wash water, drying the precipitate to a water content of about 40 to 50 percent, mechanically working the iron molybdate between surfaces moving at different linear speeds to shape the iron molybdate into granules having the same size and shape with each granule having a diameter substantially equal to its height, further drying the granules and activating them by a progressive thermal treatment between the range from 100° C. to 450° C.

7. A process for preparing a non-supported, that is carrier-free, active catalyst consisting of molybdenum oxide and iron oxide for the catalytic oxidation of methanol to formaldehyde, the weight ratio of molybdenum to iron in the finished catalyst being between about 3.9 and 4.3, said catalyst requiring no pre-activation in the reactor used for carrying out said catalytic oxidation, and being characterized by high resistance to crumbling in transportation and during the said catalytic oxidation, said process comprising mixing an aqueous solution of an ammonium molybdate and an aqueous solution of ferric chloride, in which the weight ratio of molybdenum to iron is between about 4.5 and 4.7, to precipitate an iron molybdate, washing the precipitate to remove water soluble salts, separating the iron molybdate precipitate from the wash water, drying the precipitate to a water content of about 40 to 50 percent, mechanically working the iron molybdate between surfaces moving at different linear speeds to shape the iron molybdate into granules having the same size and shape with each granule having a diameter substantially equal to its height, further drying the granules and activating them by a progressive thermal treatment between the range from 100° C. to 450° C.

8. The process of claim 7, the solutions each having a concentration of about 5% by weight.

9. A process for preparing a non-supported active catalyst consisting of molybdenum oxide and iron oxide, for the catalytic oxidation of methanol to formaldehyde, said catalyst requiring no pre-activation in the reactor used for carrying out said catalytic oxidation, and being characterized by high resistance to crumbling in transportation and during the said catalytic oxidation, said process comprising mixing an aqueous solution of a soluble molybdate and an aqueous solution of a soluble iron salt to precipitate an iron molybdate, washing the precipitate to remove water soluble salts, separating the iron molybdate precipitate from the wash water, drying the precipitate to a water content of about 40 to 50 percent, mechanically working the iron molybdate between surfaces moving at different linear speeds to shape the iron molybdate into granules having the same size and shape with each granule having a diameter substantially equal to its height, further drying the granules in an air current for several hours at about 15° to 30° C., then for several hours at temperatures gradually increasing up to about 120° C.

10. A process for preparing a non-supported active catalyst consisting of molybdenum oxide and iron oxide, for the catalytic oxidation of methanol to formaldehyde, said catalyst requiring no pre-activation in the reactor used for carrying out said catalytic oxidation, and being characterized by high resistance to crumbling in transportation and during the said catalytic oxidation, said process comprising mixing an aqueous solution of a soluble molybdate and an aqueous solution of a soluble iron salt to precipitate an iron molybdate, washing the precipitate to remove water soluble salts, separating the iron molybdate precipitate from the wash water, drying the precipitate to a water content of about 40 to 50 percent, mechanically working the iron molybdate between surfaces moving at different linear speeds to shape the iron molybdate into granules having the same size and shape with each granule having a diameter substantially equal to its height, further drying the granules in an air current for several hours at about 15° to 30° C., then for several hours at temperatures gradually increasing up to about 120° C., and activating the granules by progressively increasing the temperature from about 100 to the range of 400 to 450° C. over a period of at least four hours, and then keeping the catalyst at between 400 and 450° C. for at least four hours.

11. A non-supported, that is carrier-free, catalyst for catalytic oxidation of methanol to formaldehyde prepared by a process comprising mixing an aqueous solution of an ammonium molybdate and an aqueous solution of ferric chloride to precipitate an iron molybdate, washing the precipitate to remove the water soluble salts, separating the iron molybdate, reducing the water content to about 40–50%, thus obtaining a cake, breaking and mechanically working the cake between surfaces moving at different linear speeds and shaping the cake into granules of the same size and shape and each having a diameter substantially equal to its height, further drying the granules and activating them by a progressive thermal treatment up to 400–450° C., said catalyst consisting of 78 to 81 percent $MoO_3$ and 18 to 19 percent $Fe_2O_3$, with a weight ratio of Mo/Fe of 3.9–4.3, said catalyst requiring no preactivation in the catalytic oxidation, and being characterized by high resistance to crumbling is transportation and during said catalytic oxidation.

References Cited in the file of this patent
UNITED STATES PATENTS

| | | |
|---|---|---|
| 1,913,405 | Meharg et al. | June 13, 1933 |
| 2,439,880 | Arnold | Apr. 20, 1948 |
| 2,501,042 | Gear | Mar. 21, 1950 |
| 2,780,561 | La Forge | Feb. 5, 1957 |
| 2,812,309 | Allyn et al. | Nov. 5, 1957 |
| 2,812,310 | Walker et al. | Nov. 5, 1957 |
| 2,824,159 | Kelly et al. | Feb. 18, 1958 |
| 2,849,492 | Allyn | Aug. 26, 1958 |
| 2,852,564 | Warner et al. | Sept. 16, 1958 |